United States Patent [19]

Hamm

[11] Patent Number: 5,360,664

[45] Date of Patent: Nov. 1, 1994

[54] ARTIST'S WORKING SUPPORT

[76] Inventor: James F. Hamm, P.O. Box 303 5900 Goodrich Rd., Clarence Center, N.Y. 14032

[21] Appl. No.: 24,479

[22] Filed: Mar. 1, 1993

[51] Int. Cl.$^5$ .................... B32B 7/00; B32B 15/00; B32B 21/04
[52] U.S. Cl. .................... 428/246; 428/151; 428/284; 428/285; 428/537.1; 428/190
[58] Field of Search ............... 428/151, 246, 284, 285, 428/537

[56] References Cited

U.S. PATENT DOCUMENTS 4,065,596 12/1977 Groody .................. 428/537

Primary Examiner—George F. Lesmes
Assistant Examiner—Kathryne E. Shelborne
Attorney, Agent, or Firm—James J. Ralabate

[57] ABSTRACT

This invention involves an artist's working support or panel that is durable, of high quality, and long lasting. The structure has a planar core material usually balsa wood with a stressed-skin layer or sheet adhered to its front and back surface. Specific adhesives are used to enhance the quality of the working support. The panel is completed by adhering a finishing material such as canvas or paper to at least one surface of the panel.

8 Claims, 1 Drawing Sheet

ARTIST'S WORKING SUPPORT

This invention relates to an artist's working support on which a medium is applied and, more specifically, to a durable, high quality and longer-lasting support than heretofore available.

BACKGROUND OF THE INVENTION

It has been known to provide artist's laminated supports upon which an artist may produce a painting or work of art. A problem encountered with prior art workpieces or supports is that of relatively short longevity. Changes in relative humidity often cause supports to buckle and warp over time. Use of poor quality materials such as laminated cardboard or processed wood fiber supports leads to premature degradation. There is a present need for an artist's support that is durable, of a high quality and relatively strong.

Artist's supports or working surfaces have been disclosed in U.S. Pat. Nos. 4,344,997 (Paquette) and 4,720,406 (Dixon). In Paquette the support disclosed has a rigid backing of a curved piece of masonite or wood. The support has a concave surface with sides that flare out from the base portion. A canvas surface is secured directly to the backing by appropriate adhesives. Paquette's worksheet or support has a non-planar contour which allows the artist to produce paintings, portions of which have a different spatial relation. This patent does not improve on the more widely used planar solid supports as described earlier in this invention, nor does it address the most important aspect of any artist's support, physical stability. Instead, it addresses the more specialized situation of attempting to aid the artist in creating a sense of depth by physically providing depth or texture in the support.

Dixon, U.S. Pat. No. 4,720,406 discloses a canvas for use by an artist including a flexible substrate material having a surface coating of an animal glue. The substrate is an open weave nylon having a specific denier range. The substrate is then mounted on a stretching framework backed by butcher's paper. The canvas of Dixon is prepared by coating a sheet of the substrate with a binding material, drying the resulting sheet and glazing the material with a glazing compound that dries to a translucent layer. The resulting sheet is then dried and is ready for use. In Dixon an open weave canvas comprised of either nylon, polyester or silk is coated with rabbit skin glue and "refined animal glue which forms a translucent glaze as the painting surface". Although the suggestion of nylon or polyester fabrics as supports for artwork may show an improved durability over high quality linen fabric, rigidity may be the same or less. This is because the canvas preparatory coating and/or sizing layers have a strong influence on the overall stiffness of the support. Since the inventor claims that the binding material is flexible, the substrate will not provide a given paint layer with sufficient support over time, even after tensioning on a standard artist's wooden stretcher. Furthermore, the use of hide glue in sufficient quantities to saturate a fabric support as described in the patent, will surely produce large dimensional changes of the support as the ambient relative humidity changes. These large dimensional changes will impose equally large stresses on any paint layer which will inevitably lead to premature failure of the paint.

In all of the known prior art there is not disclosed an artist's support that satisfactorily minimizes warping and distortion of the finished support over a period of time, nor that utilizes high quality and durable materials for increased longevity.

SUMMARY OF THE INVENTION

It is therefore an object of this invention to provide an artist's support devoid of the above-noted disadvantages.

Another object of this invention is to provide an artist's support that is structurally strong and long lasting.

A further object of this invention is to provide an artist's working support that is relatively easy to produce yet of a very high quality.

A still further object of this invention is to provide a rigid lightweight yet durable artist's support.

These and other objects of this invention are accomplished by providing an artist's working support comprising a laminate structure adapted to be painted, said laminate structure comprising in combination: (a) a planar core material with a front and a back surface, (b) an adhesive on both of said front and back surfaces, (c) a skin adhered to each of said front and back surfaces, (d) a second adhesive on at least said front surface, and (e) a finishing material bonded to said second adhesive, said finishing material defining the surface to be painted. Neither of the above two prior art patent teachings takes advantage of the inherent strength and stability of a stressed-skin lamination design as does the present invention. Any of the varied embodiments of the present invention specified later provides the following benefits:

(1) planar—a uniform, planar support for artwork,
(2) non-warping—dimensionally stable through seasonal changes in relative humidity and temperature, unlike most other support panels,
(3) rigid—stiff enough to support any paint medium (linseed oil, egg tempera, gouache, casein, acrylic, etc.) without inducing cracks or other distortions in the support typical of stretched canvas supports, wooden panels or ordinary canvas boards.
(4) long lasting—will retain its desirable features over a much longer period of time than any existing product because the materials used are quite slow to chemically degrade.
(5) durable—corners are much less likely to be damaged than most other support panels (except perhaps for the panels made with the 0.005" white polyester skins); much less likely to tear, rupture, bend or wear than other product currently available.
(6) varied surface—a variety of aesthetically pleasing surfaces can be applied such as oak or other wooden veneers, watercolor paper, matboard, or linen, cotton or polyester fabrics or other appropriate materials.
(7) additionally, the artist's support of the present invention (a) can be made to any standard sizes now used by artists, (b) can be made much larger than standard sizes up to 48"×72" (even larger under special circumstances); (c) can be used for oil paint acrylic, pastels, collage, watercolor, gouache, egg tempera, casein or just about any medium desired depending on the surface finish material; (d) can be cut by hand using a mat knife (0.005" white MYLAR brand or other polyester skins only); (e)

both sides are useable if covered with a finish material; (f) can be used by art conservators as a thin, rigid secondary support for weakened artworks (either with or without a finishing material); (g) appealing appearance and weight; (h) provides the professional artist with a top quality choice in a field of products which exists primarily because of low cost or easy availability. In art conservation, the non-hygroscopic working support of this invention could be used behind an already completed artist's work. This prevents it from warping and carries the stress the art is under, thus contributing to the preservation of the artwork. The finishing material of this invention is optional when the support of this invention is used in art conservation. Also this support could be used to support artwork in shipping or transport, storage, framing or in correcting certain damages.

The components of the present invention comprise: a core material, adhesives, skins and a final working surface or finishing material such as canvas or paper.

A. A core material is end-grain balsa wood. A particular preferred product used is Rigid Endgrain Panel, D-100 Select, with a Lamprep finish produced by the Baltek Corporation. Thickness can range from ¼" to 1" although any thickness over ¼" may be suitable. Other core materials such as matboard or other suitable cores may be used.

B. Skin materials are non-hygroscopic and are bonded to both sides of the core and may be any of the following although both skins on any given panel are prepared to be the same material and approximate thickness in order to maintain cross-sectional symmetry:
1. G-10 epoxy/fiberglass sheet, normally .010" to 0.020" thickness although other thicknesses can be used;
2. white polyester sheet (similar to DuPont MYLAR brand) 0.005"–0.010" thick although other thickness and types of polyester film can be used;
3. other suitably thin, rigid, lightweight and strong plastic, fiberglass reinforced plastic or metal sheets.

C. The bonding adhesive may be comprised of:
1. Beva heat seal film: two ethylene vinyl acetate (EVA) resins (Dupont Elvax 150 and Allied Chemical A-C 400) of different melting points. Secondary resins are BASF Ketone N (polycyclohexanone) and Hercules Cellolyn 21 (a pine ester resin);
2. structural epoxy heat set adhesive, polyester resin heat set adhesive or similar;
3. hot melt adhesive;
4. water-based adhesive; and
5. any other suitable adhesive.

The materials mentioned in A, B, and C above are selected and bonded together in sections typically 48"×72" using heat and pressure as appropriate. These panels are cut into the desired final dimensions and either used "as is", or a finishing material selected, cut and bonded in place.

D. One of the following finish materials may be bonded to one or both sides of the panel with one of the adhesives in "C" above:
1. linen canvas unprimed;
2. linen canvas primed with acrylic gesso or white lead in linseed oil;
3. cotton duck canvas unprimed;
4. cotton duck canvas primed with acrylic gesso or white lead in linseed oil;
5. watercolor paper;
6. 100% rag content matboard;
7. traditional hide glue/gypsum gesso over open weave canvas;
8. wooden veneers (oak, mahogany poplar or other):
9. white polyester fabric (Terytex #39 or #1666) either primed with acrylic gesso or unprimed. This is the material of choice for stability and comparability with all paint media especially acrylic dispersion. Acrylics can discolor when used on traditional supports but will not change color due to support-induced discoloration when applied to a polyester canvas; and
10. other suitable material.

DESCRIPTION OF THE DRAWING AND PREFERRED EMBODIMENT

Figure 1:
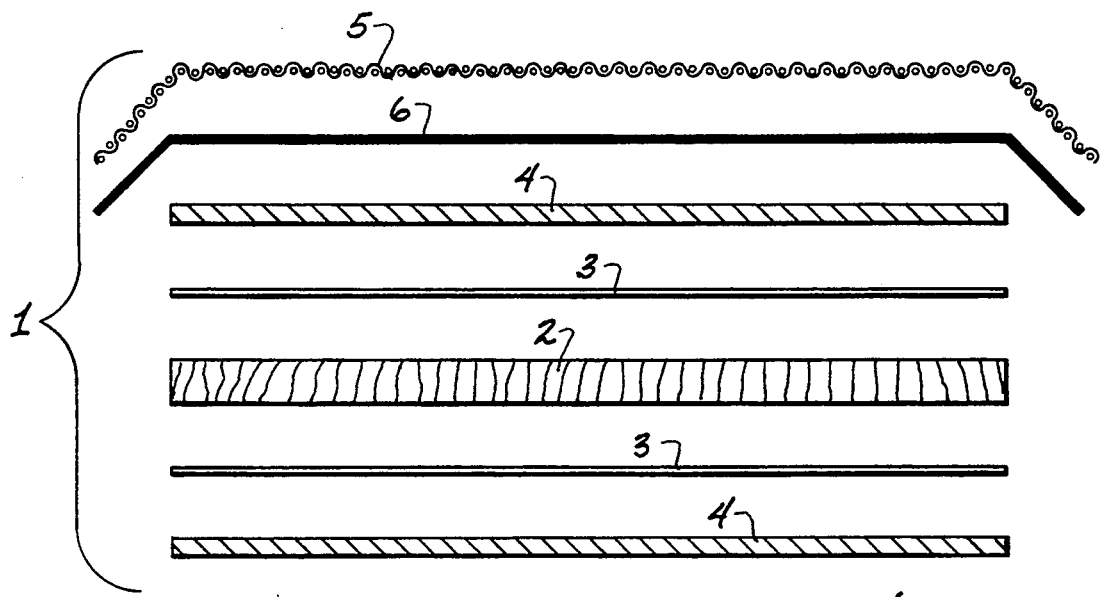
FIG. 1 is an exploded side view of the components of the support of this invention in a separated mode.

An artist's working support or support panel 1 is constructed generally of lightweight, durable materials laminated under heat and pressure to form a stressed-skin structure which is planar and rigid. In a stronger, heavier, stiffer and somewhat more expensive embodiment the following is used: an endgrain balsa wood core 2 having on both sides thereof an adhesive 3 preferably an ethylene vinylacetate adhesive. Skin materials 4 are bonded to both sides of core 2 by adhesive 3. The skin materials 4 preferred for the stronger and stiffer embodiments are fiberglass reinforced plastic (FRP) sheets made by Accurate Plastics, Inc. and identified as G-10. Skin thickness can range from 0.010" to 0.020" for maximum strength and minimum weight. The less stiff, lighter and less expensive embodiment uses endgrain balsa wood core 2 and the white polyester sheet 4, such as MYLAR which is a trademark of The DuPont Company. Thickness of the white polyester sheet ranges from 0.005" to 0.010", usually. The core 2 is end-grain balsa wood with a thickness of ¼". The adhesive 3 is primarily a mixture of two ethylene vinylacetate (EVA) resins or a structural epoxy. The panels may be finished by attaching by adhesive 6 a standard art support or finishing material 5. The finishing material 5 may be linen, cotton or polyester fabric, watercolor paper, matboard or selected wooden veneers such as oak, mahogany or poplar. Preferred veneers are those which are available pre-mounted to paper or fine fabric for ease of handling. The adhesive 6 used can be the same as adhesive 3 or any other suitable adhesive.

Figure 2:
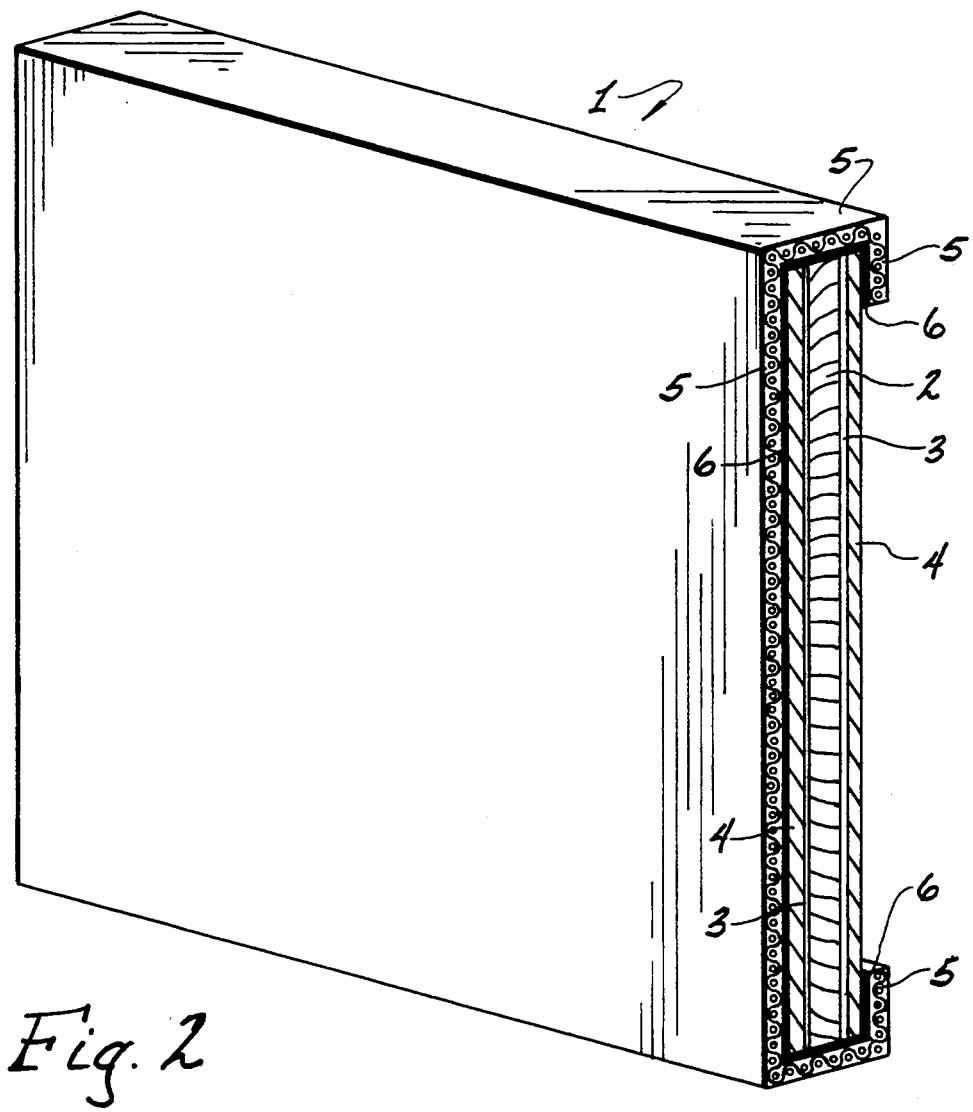
FIG. 2 is a perspective side view of the components of the support of this invention in an assembled mode.

In FIG. 2 the same working support 1 is illustrated in its final usable form. To produce the support, materials 2, 3, and 4 are cut or adjoined in order for each to measure 48"×72" overall. Adhesives 3 are applied to skins 4 and set in position on each face of core 2. Using heat and pressure, these materials are bonded together to form the basic stressed skin support. This basic support is cut into the desired final dimensions using a panel saw and fine toothed blade. The cut basic support can either be used "as is" (usually for art conservation purposes), or finished by attaching finishing material 5, cut somewhat larger than the basic cut support. Adhesive 6 is bonded to one side of material 5 using heat and pressure. Finishing material 5 and adhesive 6 are then bonded to the basic support, wrapped around the edges and 1–2" onto the back perimeter, again using heat and pressure.

In cases where finishing material 5 is a wooden veneer or other stiff material, it will be bonded to the face side of the cut basic support only and trimmed flush with the face edges on all sides.

The preferred and optimumly preferred embodiments of the present invention have been described herein and shown in the accompanying drawing to illustrate the underlying principles of the invention, but it is to be understood that numerous modifications and ramifications may be made without departing from the spirit and scope of this invention.

What is claimed is:

1. An artist's working support comprising a laminate structure adapted to be painted, said laminate structure comprising in combination:
   A. a planar core material with a front and a back surface;
   B. an adhesive on both of said front and back surfaces;
   C. a skin adhered to each of said front and back surfaces;
   D. a second adhesive on at least said front surface; and
   E. a finishing material bonded to said second adhesive, said finishing material defining the surface to be painted, wherein said finishing material is selected from the group consisting of fabrics, paper, wooden veneers and mixtures thereof; and wherein said skin is selected from the group consisting of a polyester, an epoxy, a fiberglass material and mixtures thereof.

2. The working support of claim 1 wherein said finishing material is bonded continuously to the front surface of said skin and extends to at least a portion of a back surface of said skin.

3. The working support of claim 1 wherein said finishing material is a material selected from the group consisting of canvas, linen canvas, natural and synthetic fabrics, paper, wood veneers and mixtures thereof.

4. The working support of claim 1 wherein said adhesive is a material selected from the group consisting of acetates, epoxies, ketones, esters and mixtures thereof.

5. The working support of claim 1 wherein said core material is balsa wood, said adhesive is ethylene vinylacetate, said skin has a thickness of from about 0.005-0.020 inches and is selected from the group consisting of an epoxy-fiberglass sheet, a polyester sheet and mixtures thereof and said finishing material is a linen canvas.

6. An artist's working support comprising a laminate structure adapted to be painted, said laminate structure comprising in combination:
   A. a planar core material of endgrain balsa wood, said core material having a front and a back surface;
   B. a first adhesive on both of said front and back surfaces, said heat seal adhesive comprising a material selected from the group consisting of an ethylene vinylacetate resin, an epoxy, a polycyclohexanone resin, a pine ester resin and mixtures thereof;
   C. a skin having a thickness of about 0.005-0.020 inches and adhered to each of said front and back surfaces, said skin selected from a group consisting of an epoxy-fiberglass sheet, a polyester sheet and mixtures thereof;
   D. a second adhesive on at least said front surface and
   E. a finishing material bonded to said second adhesive, said finishing material selected from the group consisting of a natural fabric, a synthetic fabric, linen canvas, watercolor paper, matboard, fabric, wooden products and veneers and mixtures thereof, said finishing material defining the surface to be painted.

7. The working support of claim 6 wherein said first and second adhesives are the same materials.

8. The working support of claim 6 wherein said first and second adhesives are different materials.

* * * * *